Nov. 10, 1964  B. E. BUDAHN  3,156,567
METHOD OF MANUFACTURING CHEESE CONTINUOUSLY
Filed May 3, 1963  2 Sheets-Sheet 2
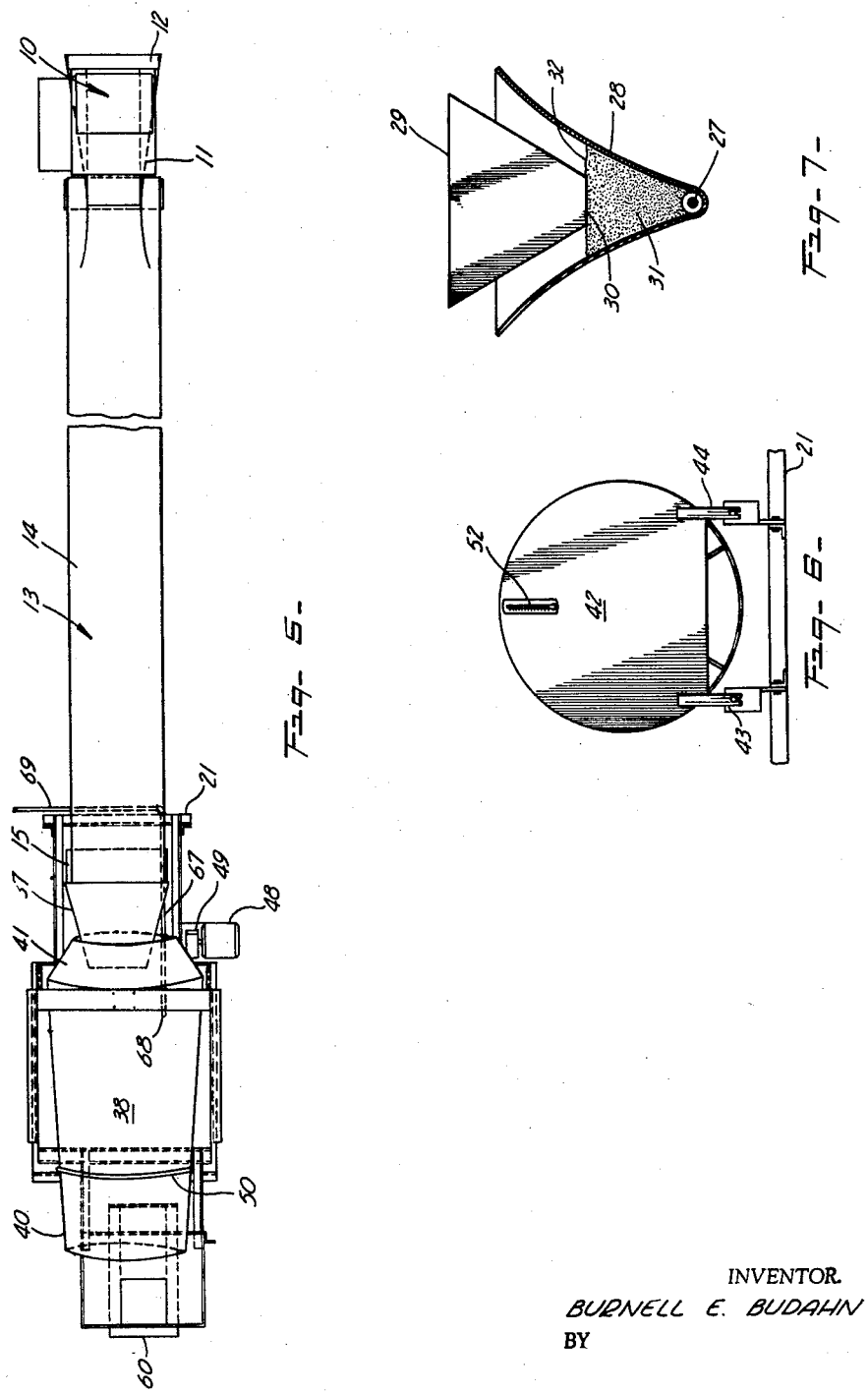
INVENTOR.
BURNELL E. BUDAHN
BY
ATTORNEYS United States Patent Office 3,156,567
Patented Nov. 10, 1964

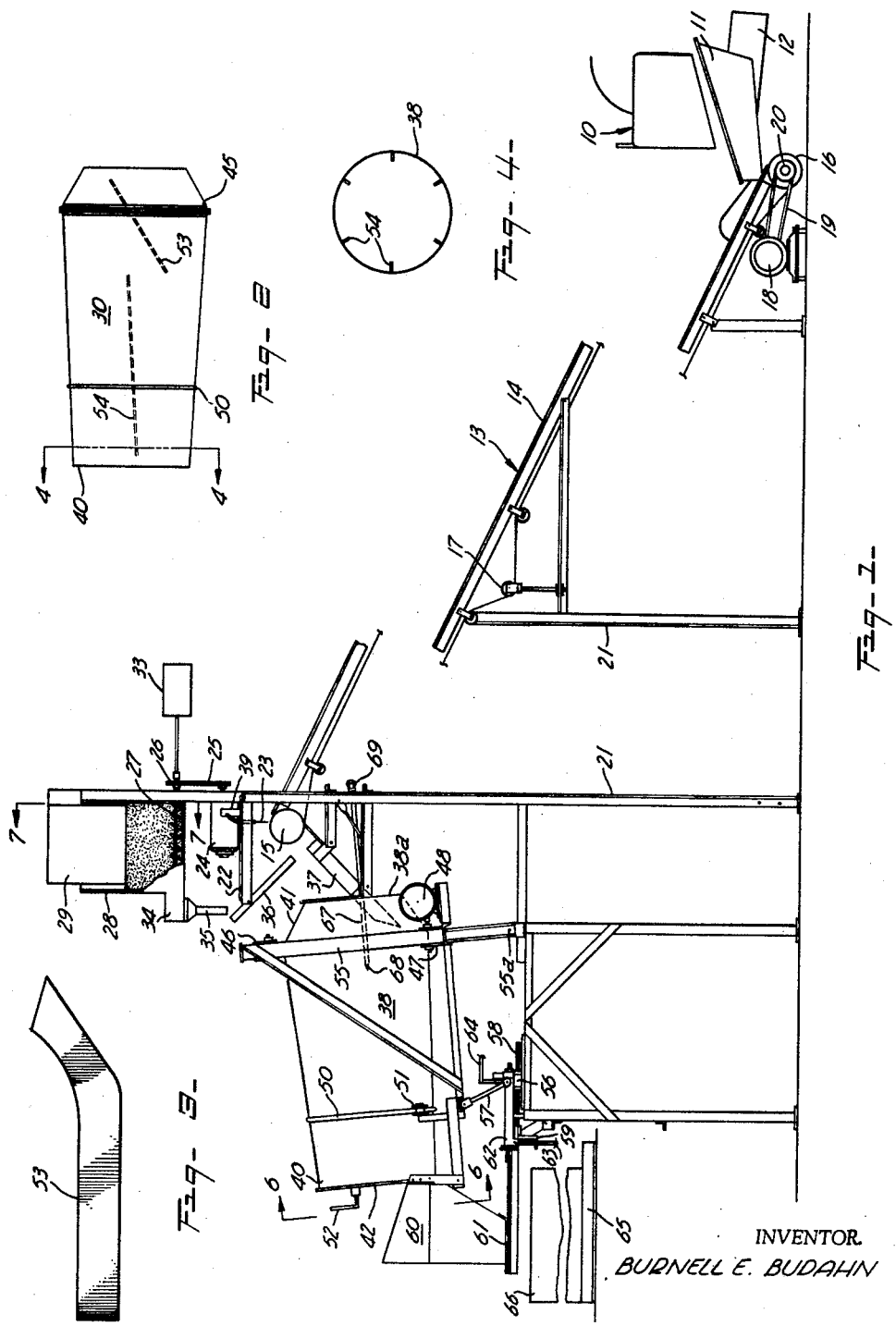

3,156,567
METHOD OF MANUFACTURING CHEESE
CONTINUOUSLY
Burnell E. Budahn, Norwood, Minn.
Filed May 3, 1963, Ser. No. 277,856
10 Claims. (Cl. 99—115)

This invention relates to cheesemaking. More particularly, it relates to methods for use in the continuous manufacture of cheese from preprepared cheese curd.

Cheesemakers throughout the world have for well over a century sought for methods of manufacturing cheese in a continuous operation from cheese curd. This has been true because of the excessive time and labor elements heretofore required for the milling, salting, mixing, and hooping operations which have necessarily restricted the capacity of the cheese plants so that maximum production has never been attained. The desirability for methods of manufacture which would permit the continuous manufacture of cheese has long been recognized but all efforts to perfect methods for commercially manufacturing cheese continuously have failed for one reason or another and generally for various combinations of such reasons. My invention which is described herein is directed to methods for continuously manufacturing cheese commercially from cheese curd in a successful manner. In addition, it is directed to methods of manufacture of cheese which not only permit the operation to be continuous but also produces a superior product and at a substantial saving. My invention as disclosed and claimed herein is related to my other application entitled "Apparatus for Continuously Manufacturing Cheese, Serial No. 227,862, filed May 3, 1963.

It is a general object of my invention to provide novel methods of manufacturing cheese from preprepared curd continuously.

A more specific object is to provide novel methods of manufacturing cheese from preprepareed curd continuously on a commercial scale and in a practical manner.

Another object is to provide novel methods of manufacturing cheese continuously which are simple and inexpensive to practice.

Another object is to provide novel methods for manufacturing cheese from preprepared curd in a continuous operation whereby the milling, salting, mixing, and hooping operations may be effected in a continuous procedure.

Another object is to provide novel methods for continuously manufacturing cheese at unusually high volume capacity.

Another object is to provide novel methods which will enable the cheese to be manufactured continuously and while accomplishing the same in a minimum amount of time will effect substantial savings in labor.

Another object is to provide novel methods for manufacturing cheese continuously and for effecting substantial savings against the normal loss resulting from cheese production.

Another object is to provide novel methods for continuously manufacturing cheese which will greatly increase the capacity of the cheese plant.

Another object is to provide novel methods for manufacturing cheese in a continuous operation which will produce a superior product and, in particular, will produce a product having substantially fewer mechanical holes and improved consistency.

These and other objects and advantages of my invention will more fully appear from the following description, made in connection with the accompanying drawings, wherein like reference characters refer to the same or similar parts throughout the several views, and in which:

FIG. 1 is a partially diagrammatic side elevational view of my apparatus with portions of the conveyor and cheese container omitted to facilitate the disclosure and with portions of the salt dispensing mechanism broken away to better illustrate the construction and operation thereof.

FIG. 2 is a diagrammatic plan view of the tumbling drum only.

FIG. 3 is a side elevational view of the tumbling blades carried upon the interior surface of the tumbling drum and shown on an enlarged scale.

FIG. 4 is a diagrammatic view taken along line 4—4 of FIG. 2.

FIG. 5 is a diagrammatic plan view of the entire cheese manufacturing apparatus to practice my invention.

FIG. 6 is an end elevational view of the tumbling drum as viewed from the discharging end.

FIG. 7 is a sectional view taken along line 7—7 of FIG. 1.

Apparatus to practice my invention as shown in the drawings includes a milling device indicated generally by the numeral 10 which is of conventional construction as well known in the art and as utilized conventionally in cheese manufacturing plants. It has been shown diagrammatically in FIGS. 1 and 5 and is designed to receive preprepared curd and mill the same into relatively small chunks or particles which are commonly referred to as "milled curd" and are approximately three-fourths inch cubes in dimensions. The milling devices 10 may be fed with preprepared cheese curds by hand or fed by conveyor (not shown). As best shown in FIG. 1, the milling device 10 is disposed above a vibrator 11 which is vibrated rapidly by a vibrating mechanism shown generally and indicated by the numeral 12.

The vibrator 11 is sloped somewhat downwardly and forwardly to discharge upon an elongated upwardly inclined continuous conveyor indicated generally by the numeral 13. The preprepared milled curd is deposited upon the conveyor 13 by the vibrator 11 in a uniform layer which is approximately 1–2 inches thick or considered with respect to the particle size, with a depth of approximately 2–3 particle thickness. The conveyor 13 includes preferably a continuous rubber belt 14 which passes around an upper roller 15 and a lower roller 16. A tightener 17 is provided to permit the tensions applied to the rubber apron 14 to be varied as desired. An electric motor 18 by means of a belt 19 drives a sheave 20 which is connected to the roller 16 in driving relation to cooperatively drive the apron 14 so as to carry the curd forwardly and upwardly as illustrated. It will be noted that the entire conveyor 13 is supported by an upstanding frame 21.

The uppermost portions of the frame 21 support a horizontal platform 22 which in turn supports an electric motor 24 which carries a continuous chain drive 25 that extends upwardly around a sprocket 26 to drive an auger conveyor 27. This auger conveyor 27 is disposed within the lower part of a generally V-shaped feeder bin 28 as best shown in FIG. 7. The feeder bin 28 is also supported upon the platform 22 and it is continuously fed by a charging bin 29 the lower end 30 of which extends downwardly into the interior of the feeder bin 28 to maintain a constant supply of salt 31 for the auger conveyor 27 and to maintain the upper lever 32 of the salt at a predetermined elevation so as to maintain a uniform pressure or weight of salt upon the auger conveyor 27 to insure a uniform rate of feeding by the auger if the auger is operated at a uniform speed. The motor 24 is provided with a positive instantly variable drive which drives the continuous chain 25 so that the speed of rotation of the auger 27 may be varied as desired.

A tachometer 33 is connected to the continuous conveyor 27 so that the number of revolutions per minute may be observed continuously, if desired. The forward end of the auger conveyor 27 extends into a conveying tube 34 which discharges into a funnel 35 which in turn discharges the salt into a chute member 36. The chute member 36 is inclined downwardly and rearwardly and discharges the salt into a chute 37 which is mounted on the frame 21 and extends downwardly and forwardly into the tumbling drum as will be hereinafter described. It should be noted that the chute 37 is positioned in receiving relationship to the discharging upper end of the conveyor 13 so that the milled curd will be discharged into the chute 37 and carried thereby into the interior of the tumbling drum.

Pivotally mounted upon the frame 22 is a curd engaging blade 23 which extends downwardly into the path of the curd carried by the conveyor 13 and engages the same. It is mounted for swinging movement about a horizontal axis extending transversely of the conveyor 13 and is constructed and arranged in controlling relationship with a switch mechanism indicated generally by the numeral 39. It is so arranged in controlling relationship with the switch mechanism as to hold the switch of the latter in closed position so long as the blade 23 is deflected off vertical position by the flow of the milled curd. When the flow of the milled curd ceases, the blade 23 returns to vertically hanging position and permits the switch to open. The switch mechanism 39 is interposed in the electric circuit supplying power to the electric motor 23 so as to cause the motor 24 to cease operation when the flow of curd ceases and hence arrest the dispensation of salt by the salt dispensing conveyor 27.

As best shown in FIG. 1, the lower end of chute 37 terminates within the interior of a rotating tumbling drum 38. As shown, this rotating tumbling drum is pivotally supported by the frame 21 adjacent its receiving end 38a. The tumbling drum 37 is open ended and, accordingly, has a discharging end 40. The receiving end 38a is tapered inwardly as at 41 and the remainder of the drum tapers gently toward the discharging end 40. The discharging end 40 is closed to a substantial extent by a closure plate 42 as best shown in FIG. 6. This plate 42 is supported by support brackets 43 and 44 which have slots on their lower ends to receive securing bolts (not shown) which are carried by the frame 21. These support brackets can be clearly seen in FIG. 6.

Encircling the tumbling drum 38 adjacent its receiving end 38a is a ring gear 45. The teeth of the ring gear extend outwardly and cooperate with an idler gear 46 which is disposed at the top and center of the drum and a pair of gears disposed at the opposite and lower side of the drum. One of these gears (not shown) is an idler gear and the other gear 47 is driven by an electric motor 48 by means of a gear reduction mechanism 49 to cause the drum 38 to rotate continuously. An annular rail 50 encircles the drum 38 adjacent the discharge end 40 thereof. This rail 50 is received within the grooves of a pair of circumferentially grooved idler rollers one of which is not shown and the other of which is identified by the numeral 51. These rollers 51 are disposed at opposite sides of the drum 38 and adjacent the lower portions thereof. It will be noted that the drum 38 is disposed so as to rotate about a generally horizontal axis, the axis of the drum as shown being inclined slightly downwardly and forwardly.

A thermometer 52 is mounted on the closure plate 42 and is connected with the interior of the drum so as to record the temperature therewithin.

Mounted upon the inner surface of the tumbling drum 38 is a plurality of tumbler blades or progressor elements 53. The construction or shape of these tumbler blades is best shown in FIG. 3. As shown in FIG. 2, these tumbler blades 53 extend axially of the drum. They also extend radially inwardly and at an angle to the axis of rotation so that the end thereof closest to the discharging end trails as the drum is rotated. These tumbling blades 53 engage the milled curd and carry the same around with the drum 38 until the tumbler blade reaches a position adjacent the uppermost portion of its path at which point the curd tumbles off the blade and falls to the lowermost portions of the tumbling drum. The orientation of these blades relative to the axis of rotation of the drum causes the curd to be gradually progressed toward the discharging end 40 of the drum and eventually the curd is discharged from the discharging end 40. Also mounted upon the inner surface of the tumbling drum 38 is a plurality of curd rolling elements 54 which extend axially of the drum and also radially inwardly but to a much lesser extent than the blades 53 as can be seen by reference to FIG. 4. These blades 54 are also oriented at an angle to the axis of rotation of the drum 38 but to a lesser degree than the blades 53. These rolling elements 54 engage the curd and causes the latter to roll over the top thereof as the drum rotates. They do not carry the curd upwardly along the side of the drum to any appreciable extent but rather induce the curd to roll relative to each other with the major portion of the curd passing over the top of the individual elements 54.

It will be noted that the tumbling drum 38 is partially enclosed by a rectangular framework 55 and that this framework is pivotally mounted as at 55a upon the frame 21 so that the discharging end 40 thereof can be elevated or lowered as desired. To accomplish the adjustment of the discharging end 40 of the drum, I utilize an internally threaded sleeve 56 which is pivotally connected by a link 57 to the frame 55 adjacent the discharging end 40 of the tumbling drum. This sleeve 56 threadedly engages a screw threaded shaft 58 which can be rotated about its longitudinal axis by means of a crank 59.

A filling chute 60 is carried by the frame 55 in receiving position relative to the discharging end 40 of the drum 38. The chute 60 is provided with a transversely slidable gate 61 which is operated by an air cylinder 62 which is provided with air by means of hoses 63 and 64.

Disposed beneath the filling chute 60 is an over and under scale 65 which is provided with an electric eye (not shown) and which is not a part of the invention shown and claimed herein that is electrically connected with an electronic control for valves disposed in the air lines 63 and 64 so that when the desired weight of curd has been received within the cheese barrel or hoop 66, the gate 61 will be caused to move to closed position. The barrel or hoop 66 may be moved manually if desired and replaced by another barrel or hoop. An automatic timing device is connected with the air cylinder 62 so as to cause it to open the gate after a predetermined period of time has elapsed subsequent to closing of the gate 61.

A steam dispenser 67 having a discharge 28 disposed within the interior of the drum 38 is provided in order to continuously inject steam into the interior of the rotating drum 38. This steam dispenser 67 is connected by a hose 69 to a source of pressurized live steam (not shown) which maintains the steam under a pressure of about 60 p.s.i. Manual control valves (not shown) may be provided if desired or, if desired, electrically controlled valves may be interposed in the line 69 and electrically connected with the salt dispensing apparatus so as to insure that steam will be injected at all times while curd is being received within the tumbling drum 38.

In operation, the slabs of preprepared cheese curd are introduced into the milling device 10 continuously either by hand or through the use of a conveyor. It will be understood that the preprepared curd has been prepared in the usual manner conventional in dairy plants and has been arranged in slabs as is conventional. The conventional milling device 10 mills the curd into a plurality of small pieces of cheese curd which are deposited on the vibrator 11. The vibrator 11, which is driven by the mechanism 12, causes the milled curd to be deposited upon the upper surface of the rubber apron 14 in a uniform layer of approximately 1–2 inches in depth from whence it is carried upwardly to the upper end of the conveyor 13 at which point the curd engages the blade 23. Engagement of the blade 23 by the curd causes it to move or swing to the left as viewed in FIG. 1 and thereby actuate or close the switch in the switch mechanism 39 which in turn actuates the motor 24 and the salt dispensing mechanism 27. As the auger 27 is driven, it carries salt into the conveying tube 34 and deposits the same via the funnel 35 into the chute 36 from whence the salt descends and engages the milled curd as it is discharged off the upper end of the conveyor 13. The salt which is discharged from the chute 36 and the milled curd descends into the chute 37 and is carried into the interior of the continuously rotating tumbling drum 38 as will be readily understood by reference to FIG. 1.

Concurrent with the dispensation of the salt by the auger 27, steam is injected into the interior of the rotating drum 38 via the discharge 68. As previously pointed out, this may be accomplished through the use of manual valves or electronically controlled valves which are electrically connected with the salt dispensing mechanism 27 so that whenever salt is being dispensed, steam is also being dispensed into the interior of the rotating drum 38. I have found that live steam which is maintained under pressure of 60 p.s.i. upon being released as specified within the interior of the drum 38 is sufficient to maintain the temperature of the cheese curd and salt at approximately 102° F. plus or minus one degree. I have found that this is the optimum temperature for the production of a superior product and the prevention of susbtantial loss which normally would result from the handling of the cheese curd. Although the temperature within the drum 38 may range between 96°–106° F. and still perform a continuous cheese making operation, I have found that the best results are obtained if the temperature of the curd is increased by moist heat to approximately 102° F. The temperature of the slabs of curd at the time they are deposited into the milling device 10 is approximately 96° F. and this temperature is conventionally the temperature of slabs of curd when they are milled in the conventional manner which involves a prolonged period of raking, mixing, settling, etc. In the conventional manner, however, the mixing, etc. is accomplished within vats and a substantial loss of butter fat results from the curd which touches the bottom of the vat while the temperature of the milled curd at the top of the pile drops to a level below that which is desirable for the formation of cheese.

Rotation of the drum 38 will, of course, cause the tumbling blades 53 to engage the curd and salt as it is deposited into the drum. The milled curd and salt will be carried upwardly by the tumbling blades 53 to a position adjacent the uppermore portions of the path of movement of these blades at which point the curd and salt tumbles downwardly from the blade to the lowermore portions of the drum 38. It is obvious that continuous rotation of the drum 38 causes this action to be repeated continuously. The angulated orientation of the blades 53 relative to the longitudinal axis of the drum with the ends of the blades 53 closest to the discharging end 40 being disposed in trailing relation as hereinbefore described, causes the milled curd and salt to be gradually progressed toward the discharge end 40 of the drum. In other words, while the milled curd and salt is being continuously tumbled to cause the salt to be distributed evenly around the exterior of the pieces of milled curd, or in other words to coat them, the milled curd and salt is steadily being progressed toward the discharge end 40 of the drum. Once the pieces of curd and salt have passed the trailing ends of the blades 53 they are engaged by the elements 54 which extend radially a shorter distance than do the blades 53. As hereinbefore described, these rolling elements 54 tend to be drawn through the collection of milled curd at the bottom surface of the drum adjacent the discharge opening 40 and merely roll the milled curd and salt to increase the even distribution and coating of the curd with the salt until finally the milled curd and salt is discharged through the discharge end 40 of the drum into the filling chute 60.

As the well-mixed cheese curd and salt is discharged into the barrel 66 via the filler chute 60, the scale progressively indicates the weight thereof until finally an electric eye is actuated by the scale beam and electrically controlled valves in the air lines 63 and 64 causes air to be introduced into the air cylinder 62 to close the gate 61. The closing of the gate 61, of course, shuts off the discharge of the cheese curd into the barrel 66 during which period the barrel may be removed and another barrel positioned in its place beneath the chute to receive the curd upon reopening of the gate 61. The gate mechanism is automatically opened by a timer mechanism, which is not shown and which is no part of the invention disclosed herein, after a given period of time has elapsed subsequent to the closing, the timer mechanism being connected to the valves leading to the air cylinder 62 so as to cause it to move in the direction opposite to that in which it moved to close the gate 61.

After the filled barrel has been removed the contents thereof is pressed in the conventional manner which involves pressing of the cheese curd with provision being made for the whey which is squeezed out of the curd to escape. I have found that through the use of this apparatus and method of continuously manufacturing cheese there is a substantial saving in the amount of cheese which is normally lost during the pressing operation as a result of what is known in the trade as "dusting." Dusting is the phenomenon of many small particles of cheese escaping in the whey, these particles being of extremely small size so as to be difficult to discern by the naked eye.

As indicated previously, the tachometer 33 is utilized to indicate the number of r.p.m. of the auger conveyor 27. Through the use of the tachometer in combination with the positive infinitely variable drive connected with the motor 24, it is possible to regulate the rate of dispensation of the salt by the auger 27 as desired. We operate the speed of the auger within the range of 30–60 r.p.m. with the auger being of a two inch diameter. The particular number of r.p.m. is determined by the rate at which the curd is fed into the mill 10 and deposited upon the conveyor 13. I add 65–85 pounds of salt for two thousand pounds of curd which passes across the conveyor 13 and in the normal operation of this equipment, this means that we add salt to the curd at the rate of about 480 pounds per hour. When operating at this rate, we can hoop 12,000 pounds of cheese continuously per hour. Under conventional cheese manufacturing methods and with conventional apparatus, it takes approximately nine times as long to mill, salt, mix, and hoop an equal amount of cheese.

The drum 38 is preferably rotated at 9.5 r.p.m. The drum 38, when disposed as shown, will result in a tumbling period of approximately 23 seconds which means that each particle of cheese curd will be tumbled approximately 23 seconds from the time it enters the tumbling drum 38 until it is discharged from the discharge end 40. We find that a range of 20–30 seconds is approximately ideal. With this amount of tumbling time and with the conveyor traveling at the proper speed, I find that it takes less than one minute from the time the cheese curd slabs are milled until the curd has been deposited in the hoop or barrel 66. This is in sharp contrast of the conventional methods and apparatus for manufacturing cheese wherein it takes approximately twenty minutes to mill, salt, mix and hoop the cheese curd. Under the conventional methods the curd is shoveled and raked or stirred with mechanical agitators or mixers and conventionally requires a period of about 60–90 minutes for the entire operation.

As indicated above, I prefer to raise the temperature of the cheese curd and maintain it at that temperature throughout the tumbling operation. The preferred temperature is 102° F. If the temperature is permitted to drop to the lower portion of the range 96°–106°, I find that the reduced temperatures causes mechanical holes to form in the cheese. If the temperature of the curd is maintained at the higher limits of the level (100° F.) I find that this hinders the growth of desirable bacteria which develops acidity and creates a condition in the cheese known as "dry acid."

In the normal or conventional methods of manufacturing cheese, the operation normally results in a loss of approximately 25–32 pounds of butter fat per vat of cheese where each vat originally contains approximately 21,000 pounds of milk. This loss is primarily the loss referred to as "dusting" and it is lost during the salting and agitation of the curd and the pressing thereof. The loss known as "dusting" is caused by the agitation of the curd, either by shoveling or mechanical mixing, in that the tiny particles of curd escape with the whey during the draining and pressing operation. Also, in the conventional methods of manufacturing cheese there is substantial loss of butter fat which is reduced to a liquid state at the surface of the bottom of the vat and is lost with the whey as it drains from the pile of curd. In the use of my apparatus and method, I have eliminated substantially all of this loss.

In the conventional manufacture of cheese under conventional methods, the normal production is 1.70 pounds of cheese per pound of butter fat. Through the use of my methods and apparatus, I am able to obtain 1.72 pounds of cheese per pound of butter fat which means that in a cheese manufacturing plant handling approximately 25,000 pounds of butter fat daily, there is a saving of 500 pounds of cheese per day. This constitutes a very substantial saving so that the production of a plant even if it were not to take advantage of the increased capacity, will increase substantially merely through the use of my methods and apparatus.

Also of great importance is the fact that through the use of my methods and apparatus, a very substantial saving in time and labor is effected. In the conventional cheese manufacturing plant of average size, the usage of my methods and apparatus greatly reduces the amount of labor required of the employees and at the same time enables the manager of the plant to operate his plant with fewer employees. As a consequence, a very substantial saving is effected in the operational cost of a plant having a given capacity.

It will be readily appreciated, that in addition to the other advantages outlined above, through the use of my apparatus and methods it is now possible for a plant of given physical dimensions and equipment to greatly increase the capacity of the plant for the vats are no longer tied up for the prolonged period as has heretofore been conventional in the milling, salting, and mixing of the curd preparatory to hooping of the same.

From the above it can be seen that through the utilization of my novel methods it is now possible for the first time to continuously manufacture cheese on a commercial scale. It will be noted that these methods are simple and inexpensive to practice and, for the first time, make it possible to mill, salt, mix and hoop the cheese curd in a continuous operation and with an absolute minimum of time. In addition, it will be noted that through the use of these novel methods it is possible to attain an unusually high volume capacity for a given dairy plant and to effect a substantial saving in labor as well as in the end product of cheese. Moreover, the capacity of the cheese plant is increased through the use of my novel methods and the end products will be of a higher quality in that it will have substantially fewer mechanical holes and an improved consistency.

Wherever hereinafter the term "as milled" is utilized, it is intended to connote that the milled curd has not been stirred and/or heated in a vat subsequent to the milling operation as is conventional in the standard cheese making process and that the milled cured is essentially in the same condition as it was as it left the curd milling device. Whereever hereinafter the term "tumbling the curd immediately" is used, it is intended to connote that the curd is tumbled without undue delay and without being permitted to remain undisturbed sufficiently long so that the milled pieces of curd will adhere to each other to such an extent that they will not separate of themselves upon tumbling of the same.

It will, of course, be understood that various changes may be made in the form, details, arrangement and proportions of the parts without departing from the scope of my invention which consists of the matter shown and described herein and set forth in the appended claims.

What is claimed is:

1. In the making of cheese from slabs of cheese curd in a continuous operation from milling to hooping with a substantial saving in butterfat content of the cheese and a substantial reduction in dusting losses and a substantial reduction in time consumed for the operation, the steps of
   (a) milling slabs of the curd
   (b) spreading a predetermined proportionate amount of salt upon the milled curd
   (c) tumbling the curd immediately as milled and salted for such time and under such conditions as required to coat the salt evenly on the curd and keep potential dusting losses in the so tumbled curd along with the full butterfat content thereof, and
   (d) then discharging the so tumbled curd and salt into containers for subsequent pressing of the curd into cheese.

2. The steps set forth in claim 1 wherein the step of spreading a predetermined proportionate amount of salt upon the milled curd is performed immediately prior to the step of tumbling the same.

3. The steps set forth in claim 1 wherein the milled curd and salt is tumbled about 20–30 seconds.

4. The steps set forth in claim 1 wherein the step of tumbling the curd immediately as milled and salted is performed in a continuous operation.

5. The steps set forth in claim 1 wherein live steam is applied to the milled and salted curd as it is so tumbled.

6. The steps set forth in claim 1 wherein heat is applied to the milled and salted curd as it is so tumbled.

7. The steps set forth in claim 1 wherein moist heat is applied to the milled and salted curd as it is so tumbled.

8. The steps set forth in claim 1 wherein live steam under pressures of about sixty pounds per square inch is applied to the milled and salted curd as it is so tumbled.

9. The steps set forth in claim 1 wherein sufficient moist heat is applied to the milled curd as it is so tumbled to maintain its temperature at approximately 102° F.

10. The steps set forth in claim 1 wherein live steam is applied continuously to the milled curd and salt as it is so tumbled.

References Cited in the file of this patent

UNITED STATES PATENTS

| | | |
|---|---|---|
| 1,522,794 | Schaefer et al. | Jan. 13, 1925 |
| 2,494,638 | Stine | Jan. 17, 1950 |
| 2,796,351 | Walter et al. | June 18, 1957 |
| 2,813,028 | Jackson | Nov. 12, 1957 |
| 2,942,983 | Sadler et al. | June 28, 1960 |
| 3,017,274 | Dahlstrom | Jan. 16, 1962 |
| 3,075,842 | Shaver | Jan. 29, 1963 |